United States Patent [19]

Wada et al.

[11] Patent Number: 5,100,922

[45] Date of Patent: Mar. 31, 1992

[54] METHOD FOR PRODUCING A MOLDED PRODUCT OF INTEGRAL-SKIN POLYURETHANE FOAM

[75] Inventors: Hiroshi Wada, Yokohama; Kiyoshi Kaiden, Kamakura; Tadashi Shimada, Hatano; Kiyoshi Tanabe; Shoji Hayashida, both of Yokohama, all of Japan

[73] Assignee: Asahi Glass Company Ltd., Tokyo, Japan

[21] Appl. No.: 538,099

[22] Filed: Jun. 13, 1990

[30] Foreign Application Priority Data

Jun. 13, 1989 [JP] Japan .................................. 1-148262
Jun. 26, 1989 [JP] Japan .................................. 1-160687

[51] Int. Cl.$^5$ ........................... C08J 9/34; C08G 18/08
[52] U.S. Cl. ........................................ 521/51; 521/99; 521/104; 521/163; 521/168
[58] Field of Search .................... 521/51, 99, 107, 163, 521/168

[56] References Cited

U.S. PATENT DOCUMENTS

| | | | |
|---|---|---|---|
| 3,775,350 | 11/1973 | Juhas | 521/51 |
| 4,211,847 | 7/1980 | Kehr et al. | 521/163 |
| 4,559,366 | 12/1985 | Hostettler | 521/51 |
| 4,605,729 | 8/1986 | Barnes et al. | 528/44 |

FOREIGN PATENT DOCUMENTS

0080171 1/1983 European Pat. Off. .

*Primary Examiner*—John Kight, III
*Assistant Examiner*—John M. Cooney, Jr.
*Attorney, Agent, or Firm*—Oblon, Spivak, McClelland, Maier & Neustadt

[57] ABSTRACT

A method for producing a molded product of integral-skin polyurethane foam, which comprises reacting and curing (1) a high molecular weight polyol comprising, as the main component, a polyoxyalkylene polyol having, as the main constituent, oxyalkylene groups of at least 3 carbon atoms and oxyethylene groups at its molecular terminals with the overall oxyethylene group content being not higher than 15% by weight and having a hydroxyl value of not higher than 80, (2) a cross-linking agent containing a compound having an aromatic nucleus and at least two active hydrogen-containing groups selected from the group consisting of hydroxyl groups, primary amino groups and secondary amino groups, and (3) a polyisocyanate, in a mold in the presence of a catalyst and a hydrogen atom-containing halogenated hydrocarbon foaming agent.

20 Claims, No Drawings

METHOD FOR PRODUCING A MOLDED PRODUCT OF INTEGRAL-SKIN POLYURETHANE FOAM

The present invention relates to a method for producing a molded product of integral-skin polyurethane foam, wherein a certain specific foaming agent is employed.

Molded products of integral-skin polyurethane foam have excellent elasticity and feel, since the skin layer is integrally formed with the foam layer. Therefore, they are widely used for interior parts of automobiles such as steering wheels, crash pads, head rests and arm rests. Recently, their application has expanded to other fields. For example, their application to furnitures or housings for office equipments is expanding.

The integral-skin polyurethane foam is prepared by using a high molecular weight polyol, a crosslinking agent and a polyisocyanate as reactive starting materials and reacting them in a mold in the presence of a catalyst, a foaming agent, a foam stabilizer and other assisting agents, for foaming and curing. The molding is conducted by injecting a mixture of the above-mentioned materials into the mold. A low pressure foaming machine or a high pressure foaming machine (RIM machine) is used for mixing and injecting the materials.

For the production of a molded product of integral-skin polyurethane foam (hereinafter referred to simply as integral foam), it is essential to use a foaming agent composed of a low boiling point organic compound. Heretofore, as such a foaming agent, trichlorofluoromethane (boiling point: 23.8° C.) which is referred to simply as R-11 or Freon-11, has been used. However, in view of the ozone destruction problem in recent years, use of R-11 has to be restricted, and it tends to be difficult to use such R-11. As a low boiling point organic compound useful as a substitute for R-11, a hydrogen atom-containing halogenated hydrocarbon has been proposed based on the ODP (ozone destruction coefficient) data. Typical examples include 1,1-dichloro-2,2,2-trifluoroethane which is referred to simply as R-123, 1,1-dichloro-1-fluoroethane which is referred to simply as R-141b, and methylene chloride. However, such foaming agents proposed to be used in substitution for R-11 were found to have properties different from R-11 and can not simply be substituted for R-11. For example, it has been found that if a hydrogen atom-containing halogenated hydrocarbon such as R-123, R-141b or methylene chloride is simply substituted for R-11 in the conventional process for the production of integral foam, the foam withdrawn from the mold tends to undergo shrinkage or collapse (disintegrate). The present inventors have considered that this is attributable to the fact that R-123, R-141b or methylene chloride has high hydrophilicity as compared with R-11, and is likely to interact with a high molecular weight polyol. It is believed that this is caused by the presence of the hydrogen atoms in the halogenated hydrocarbon. Therefore, use of a high molecular weight polyol having relatively high hydrophobic properties, has been studied, but no adequate solution to the problem has been obtained.

The present inventors have conducted a further study to solve the above problems. As a result, they have found it possible to solve the problems by using a crosslinking agent having higher hydrophobic properties in addition to the use of a high molecular weight polyol having relatively high hydrophobic properties, or by incorporating a reactive material having high hydrophobic properties separately from the crosslinking agent. This third compound is a compound having a molecular weight per active hydrogen-containing group lower than the high molecular weight polyol and having an aromatic nucleus. Hereinafter, in the present invention, this third compound (compound (c) as mentioned hereinafter) is regarded as a crosslinking agent.

The present invention has a technical feature in that such materials are employed and thus provides:

A method for producing a molded product of integral-skin polyurethane foam, which comprises reacting and curing (1) a high molecular weight polyol comprising, as the main component, a polyoxyalkylene polyol having, as the main constituent, oxyalkylene groups of at least 3 carbon atoms and oxyethylene groups at its molecular terminals with the overall oxyethylene group content being not higher than 15% by weight and having a hydroxyl value of not higher than 80, (2) a crosslinking agent containing a compound having an aromatic nucleus and at least two active hydrogen-containing groups selected from the group consisting of hydroxyl groups, primary amino groups and secondary amino groups, and (3) a polyisocyanate, in a mold in the presence of a catalyst and a hydrogen atom-containing halogenated hydrocarbon foaming agent.

Now, the present invention will be described in detail with reference to the preferred embodiments.

The reactive materials to be used for the production of the integral-skin polyurethane foam in the present invention, include a polyoxyalkylene polyol (a) having a low hydroxyl value (i.e. a high molecular weight) as will be described hereinafter, a crosslinking agent (b) and/or an after-mentioned compound (c) and a polyisocyanate, as the main materials. Further, assisting agents as will be described hereinafter, may also be used.

As the high molecular weight polyol, a polyoxyalkylene polyol having a hydroxyl value of not higher than 80 (a molecular weight of at least about 700 per hydroxyl group) and an average number of hydroxyl groups of at least 1.8 per molecule, or a mixture of at least two such polyoxyalkylene polyols, is used. The hydroxyl value is more preferably from 5 to 60, especially from 20 to 45. The number of hydroxyl groups per molecule is more preferably from 2 to 4, especially from 2 to 3. The polyoxyalkylene polyol can be used in combination with a small amount of other high molecular weight polyols. Such other high molecular weight polyols include polyester polyols and other high molecular weight polyols commonly used as starting materials for polyurethane foams, such as hydroxyl group-containing hydrocarbon polymers. They are used usually in an amount of from 0 to 30% by weight, preferably from 0 to 15% by weight, based on the total high molecular weight polyols.

All or the main component of the high molecular weight polyol is a polyoxyalkylene polyol, the hydroxyl value and the number of hydroxyl groups of which are preferably within the above-mentioned ranges. Hereinafter, this polyoxyalkylene polyol will be referred to as a polyoxyalkylene polyol (a).

As the polyoxyalkylene polyol (a), the one having oxyalkylene groups of at least 3 carbon atoms such as oxypropylene groups, 1,2- or 2,3-oxybutylene groups or oxytetramethylene groups, as the main constituent, and oxyethylene groups in an amount smaller than the total amount of such oxyalkylene groups, is employed. The oxyethylene groups may be present in a random fashion or in a blocked fashion in the polyoxyalkylene chain. However, they are required to be present in an amount of at least 5% by weight at least at the terminals of the polyoxyalkylene chain to secure highly reactive hydroxyl groups.

The content of oxyethylene groups in the entire molecule is required to be not higher than 15% by weight, preferably not higher than 12% by weight, because if the oxyethylene group content in the entire molecule is higher, the hydrophilicity of the polyoxyalkylene polyol tends to be too high. From the viewpoint of securing the reactivity, the higher the content of the terminal oxyethylene groups, the better. Accordingly, from the two requirements, it is preferred that substantially all the amount of the oxyethylene groups is present at the terminals of the oxyalkylene chain. The oxyethylene group content is more preferably not higher than 10% by weight. Accordingly, a polyoxyalkylene polyol having from 5 to 10% by weight of oxyethylene groups at the terminals and no substantial oxyethylene groups in the molecular chain, is most preferred. Particularly preferred is a polyoxypropylene oxyethylene polyol having from 5 to 12% by weight, especially from 5 to 10% by weight, of oxyethylene groups only at the terminals of the molecular chain.

The above-mentioned high molecular weight polyol may be used in combination with a small amount of other high molecular weight active hydrogen compounds, or may contain other components such as a filler. A typical example of the latter is a polymer-dispersed polyol which is also referred to as a polymer polyol. Such a polymer-dispersed polyol is a dispersion comprising a high molecular weight polyol as a dispersing medium and fine polymer particles as a dispersed substance, which has excellent dispersion stability of the fine polymer particles. The fine polymer particles may be fine particles of an addition-polymerized polymer or a condensation polymerized polymer, and they may be prepared by polymerizing a polymer-forming material such as a monomer in the dispersing medium, or may be prepared by incorporating fine polymer particles separately prepared to the high molecular weight polyol. The content of the fine polymer particles is usually from 5 to 45% by weight. Further, even the polymer-dispersed polyol obtained by polymerizing a polymer-forming material in the high molecular weight polyol, may subsequently be diluted by an addition of the high molecular weight polyol. As the high molecular weight polyol as the dispersing medium for the polymer-dispersed polyol, the above-mentioned polyoxyalkylene polyol (a) may be employed. The hydroxyl value of the polymer-dispersed polyol decreases in correspondence with the amount of the fine polymer particles from the hydroxyl value of the high molecular weight polyol as the dispersing medium. The amount of the fine polymer particles in the polymer-dispersed polyol (which may be a diluted product) in the present invention is preferably from 1 to 30% by weight. Further, it is also possible to employ a high molecular weight polyol having fine inorganic particles such as fine silica particles incorporated instead of the fine polymer particles.

The crosslinking agent (b) is a compound having at least two active hydrogen-containing groups selected from the group consisting of hydroxyl groups, primary amino groups and secondary amino groups and having a molecular weight of less than 150 per functional group, or a mixture of at least two such compounds. Particularly preferred is a compound having a molecular weight of less than 100 per active hydrogen-containing group. The number of active hydrogen-containing groups is preferably from 2 to 3, especially 2. As the hydroxyl groups, alcoholic hydroxyl groups, particularly primary alcoholic hydroxyl groups, are preferred.

The crosslinking agent may be, for example, a polyhydric alcohol, an alkanol amine or a polyamine, and alkylene oxide adducts thereof may also be used if they have low molecular weights. Specifically, it includes, for example, ethylene glycol, diethylene glycol, dipropylene glycol, 1,4-butanediol, neopentyl glycol, 1,6-hexanediol, glycerol, a bisphenol A-alkylene oxide adduct, monoethanolamine, diethanolamine, triethanolamine, diisopropanolamine, triisopropanolamine, ethylenediamine, propylenediamine, diaminocyclohexane, isophoronediamine, diaminobenzene, toluenediamine, diphenylmethanediamine and xylylenediamine.

The compound (c) is a reactive material to improve the solubility of the foaming agent and like. The above-mentioned crosslinking agent (b) has at least two active hydrogen-containing groups and a molecular weight of not higher than 600 per functional group and having an aromatic nucleus. This compound (c) may be a compound of the same type as the above-mentioned crosslinking agent. For example, it may be the above-mentioned crosslinking agent (b) having a molecular weight of less than 150, particularly less than 100, per functional group and having an aromatic nucleus. Accordingly, a single compound may be used as the crosslinking agent (b) and the compound (c). It is of course possible to use at least two types within the scope of the above-mentioned crosslinking agent (b) (e.g. a combination of a crosslinking agent having no aromatic nucleus with other crosslinking agent having an aromatic nucleus). Preferably, the compound (c) is a compound having a molecular weight per active hydrogen-containing group higher than the crosslinking agent (b) (than the average molecular weight in the case where the crosslinking agent (b) is a mixture of two or more types). More preferably, it is a compound having a molecular weight per active hydrogen-containing group higher, particularly by at least 100, than the crosslinking agent (b). Further, the molecular weight per active hydrogen-containing group of the compound (c) is preferably from 100 to 400, more preferably from 150 to 300, and the number of active hydrogen-containing groups is preferably from 2 to 3, especially 2. As the active hydrogen-containing groups, alcoholic hydroxyl groups are preferred.

The compound (c) is preferably a polyhydric alcohol having an aromatic nucleus (such as xylylene glycol), a polyhydric phenol-alkylene oxide adduct, or an aromatic nucleus-containing amine-alkylene oxide adduct. Further, polyols obtainable by adding an aromatic nucleus such as styrene oxide to various polyvalent initiators, may also be employed. Particularly preferred are compounds obtained by adding an alkylene oxide having at least 3 carbon atoms, particularly propylene oxide, to diphenols or to aromatic nucleus-containing amines having two amine-type hydrogen atoms. The diphenols include, for example, bisphenol A (dihydroxyldiphenylpropane), dihydroxydiphenylmethane, dihydroxydiphenylether, dihydroxybiphenyl, catechol and dihydroxynaphthalene. The amine-type hydrogen atom means a hydrogen atom of an amino group. With respect to the functionality to an alkylene oxide, a primary amino group is bifunctional, and a secondary amino group is monofunctional. Accordingly, to produce a bifunctional alkylene oxide adduct, a monomamine is used in the case of a primary amino group, and a diamine is used in the case of a secondary amino group. Such an aromatic nucleus-containing amine includes, for example, aniline, toluidine, benzylamine, an N,N'-dialkylphenylenediamine and aminonaphthalene. The amount of the alkylene oxide added to such an aromatic nucleus-containing compound is usually from 1 to 8 molecules, preferably from 1 to 6 molecules, more preferably from 1.5 to 4 molecules, per phenolic hydroxyl group or per amine-type hydrogen atom.

The above crosslinking agent (b) and the compound (c) are used in a total amount of from 6 to 30 parts by weight per 100 parts by weight of the above-mentioned polyoxyalkylene polyol (a). Further, the compound having an aromatic nucleus is required to be used in an amount of at least 3 parts by weight, and the compound having a molecular weight of less than 150, particularly less than 100, per active hydrogen-containing group is required to be used in an amount of at least 3 parts by weight. Accordingly, when these requirements are all satisfied by a single compound, such a compound is required to be used in an amount of at least 6 parts by weight. When these requirements are satisfied by different compounds, each of such compounds is required to be used in an amount of at least 3 parts by weight. The upper limit of the amount of each compound is 20 parts by weight, and the upper limit of the total amount is 30 parts by weight. Preferably, each compound is used in an amount of from 3 to 15 parts by weight. It is particularly preferred to use from 5 to 15 parts by weight of the crosslinking agent (b) and from 3 to 10 parts by weight of the compound (c), with the total amount being from 8 to 25 parts by weight.

The polyisocyanate may be an aromatic, aliphatic or alicyclic compound having at least two isocyanate groups. Particularly preferred is an aromatic polyisocyanate. Specifically, it includes, for example, tolylene diisocyanate, diphenylmethane diisocyanate, naphthalene diisocyanate, toluidine diisocyanate, hexamethylene diisocyanate, isophorone diisocyanate, xylylene diisocyanate and modified products thereof. As the modified products, prepolymer type modified products, carbodiimide-modified products or nulate-modified products may be mentioned. The isocyanate content in the modified product is preferably at least 10% by weight, particularly at least 16% by weight. Preferably, diphenylmethane diisocyanate, particularly 4,4'-diphenylmethane diisocyanate, or its modified product, is used. The polyisocyanate is used in an amount of from 0.8 to 1.3 equivalent, particularly from 0.95 to 1.2 equivalent, per equivalent of other reactive materials.

As the foaming agent, water or a low boiling point organic compound may be employed. In the case of the integral foam, however, the amount of water used is small, or no substantial water is used, as compared with the production of usual polyurethane foams. As the low boiling point organic compound, a low boiling point hydrocarbon and a halogenated hydrocarbon may be mentioned as typical examples. As the halogenated hydrocarbon, a halogenated hydrocarbon having no substantial problem of the ozone destruction is mainly used in the present invention instead of trichlorofluoromethane which has been widely used heretofore. Such a halogenated hydrocarbon is a hydrogen atom-containing halogenated hydrocarbon. Such a hydrogen atom-containing halogenated hydrocarbon preferably has a boiling point of from 15 to 50° C. However, a hydrogen atom-containing halogenated hydrocarbon having a boiling point outside this range, may also be employed. For example, it is possible to use a hydrogen atom-containing halogenated hydrocarbon having a boiling point of not higher than 0° C. such as monochlorodifluoromethane (R-22), may be used. A particularly preferred range of boiling point is from 20 to 45° C. Such halogenated hydrocarbons include not only the above-mentioned R-123 (bp 27.1° C.), R 141b (bp 32.0° C.) and methylene chloride (bp 40.1° C.) but also 1,2-dichloro-1,1,2-trifluoroethane (R-123a; bp 28.2° C.), 1,1-dichloro-1,2,2-trifluoroethane (R-123b; bp 30.3° C.), 1-chloro-2,2-difluoroethane (R-142; bp 35.1° C.), 1-chloro-1,2-difluoroethane (R-142a; bp 32.0° C.), 1,1,1,2-tetrafluoroethane (R-134a; bp $-26.5°$ C.), monochlorodifluoromethane (R-22; bp -40.8° C.), 1,1- (-.) difluoroethane (R-152a; bp 25.0° C.), monochloro-1,2,2,2- ()-tetrafluoroethane (R-124; bp -12° C.), pentafluoroethane (R-125; bp -48.5° C.), 3,3-dichloro-1,1,1,2,2-pentafluoropropane (R-225ca; bp 51.5° C.) and 1,3-dichloro-1,1,2,2,3-pentafluoropropane (R-225cb; bp 56.1° C.). These hydrocarbons may be used in combination. Particularly preferred are R-123, R-141b, R-22, methylene chloride and a mixture of at least two of them. Further, as the halogenated hydrocarbon foaming agent, the above-mentioned specific halogenated hydrocarbon may be used in combination with a smaller amount of a low boiling point organic compound such as other halogenated hydrocarbon. The proportions for such a combined use are not particularly limited. However, the above-mentioned halogenated hydrocarbon is preferably at least 30% by weight, more preferably at least 40% by weight, most preferably at least 50% by weight. The low boiling point organic compound to be incorporated, preferably has a boiling point within the above range. However, it may have a boiling point outside such a range, in a case where an azeotropic composition having a boiling point within the above range is formed. Such a low boiling point organic compound which can be used in combination, may be, for example, a halogenated hydrocarbon such as R-11, a hydrocarbon or an ether. Further, the halogenated hydrocarbon foaming agent requires a stabilizer not infrequently, and therefore, a stabilizer may also be used in the present invention. In the present invention, the foaming agent is used usually in an amount of from 5 to 25 parts by weight, particularly from 10 to 20 parts by weight, per 100 parts by weight of the polyoxyalkylene polyol (a).

For the production of integral foam, it is usually essential to use a catalyst in addition to the foaming agent. Further, in many cases, use of assisting agents such as a foam stabilizer and a foam breaker, is required. As the catalyst, an organic metal compound such as a tertiary amine catalyst or an organotin compound, or other catalysts for the production of polyurethane forms, may be used alone or in combination. Particularly preferred is the use of a tertiary amine catalyst.

As the foam stabilizer, a silicone compound is widely used. Also in the present invention, use of this silicone is preferred. As such silicone, diorgano polysiloxane, or a block copolymer of diorgano polysiloxane and polyoxyalkylene, is preferred. There is no particular restriction as to the amounts of the respective assisting agents per 100 parts by weight of the polyoxyalkylene polyol (a), but the catalyst is used usually in an amount of from 0.01 to 5 parts by weight, and the foam stabilizer is used in an amount of from 0.1 to 5 parts by weight.

As the foam breaker, a known foam breaker can be used. For example, a foam breaker such as silicone oil or polybutene may be used. However, the foam breaker is not limited to such specific examples. In the present invention, as a novel foam breaker, an acidic compound having a fluoroalkyl group or its salt may be used. The acidic compound having a fluoroalkyl group is a compound having a fluoroalkyl group and an acidic group, and its salt is a salt of such an acidic compound with a basic compound. The fluoroalkyl group is an alkyl group having fluorinated carbon atoms, and two or more fluorine atoms may be present. The alkyl group is a group having at least one carbon atom, preferably from 3 to 25 carbon atoms. Preferably, the fluoroalkyl group is a highly fluorinated polyfluoroalkyl group (hereinafter represented by Rf) or Rf—R— (wherein R is an alkylene group). The highly fluorinated means that from 80 to 100% in the number of hydrogen atoms bonded to carbon atoms is substituted by fluorine atoms, the rest of hydrogen atoms may be further substituted by atoms other than fluorine atoms, such as chlorine atoms. Rf may be in the form of a linear chain or branched chain, and its carbon number is preferably from 1 to 21, particularly from 3 to 17. R is preferably at least one carbon atom, more preferably from 2 to 8. However, it is preferred that the number of carbon atoms in R is smaller than the number of carbon atoms in Rf. Further, instead of R, a polyoxyalkylene group having fluorine atoms, may be linked to the Rf group, and the carbon number of this fluorinated (poly)oxyalkylene group may be larger than the carbon number of the Rf group. The Rf $-(R-)$ group may directly be bonded to the acidic group or may be bonded to the acidic group via a certain bonding group.

In the acidic compound, two or more acidic groups may be present. However, usually one acidic group is present. The acidic group may be, for example, a carboxylic acid group, a sulfonic acid group, a thiocarboxylic acid group, a phosphoric acid residue or a phosphorous acid residue. Preferred are a carboxylic acid group, a sulfonic acid group and a phosphoric acid residue. Particularly preferred is a phosphoric acid residue. Specifically, the acidic compound includes polyfluorocarboxylic acid, polyfluorosulfonic acid, a phosphoric acid monoester of a polyfluoroalcohol, a phosphoric acid diester of a polyfluoroalcohol and a mixture thereof. Most preferably, the acidic compound is a phosphoric acid monoester or diester of a polyfluoroalcohol of the formula Rf$-(R-)$OH and a mixture thereof.

The above acidic compound can be used by itself as a foam breaker. However, when the amount of the acidic compound is large, it may give an influence over the organic metal catalyst for the production of integral foam. Therefore, it is preferred to use it in the form of a salt with a basic compound. As such a basic compound, an alkali metal compound, an alkaline earth metal compound or other basic metal compounds, may be employed. However, for the same reason as above, amines are preferred. Such amines include primary amines, secondary amines, tertiary amines and quaternary ammonium. These amines may be monofunctional or polyfunctional. They may, of course, have other functional groups such as hydroxyl groups. Accordingly, amines similar to those used as the above-mentioned crosslinking agent, may be employed. Likewise, amines similar to the tertiary amines frequently used as a catalyst for the production of integral foam, may be employed. Amines other than those described as the above crosslinking agent, include, for example, alkylamines, N-alkylamines, N-alkyl-substituted alkylenediamines, polyalkylenepolyamines, other aliphatic amines, alicyclic amines such as cyclohexylamine, aromatic amines such as aminobenzene and benzylamine, and heterocyclic amines such as morpholine. Further, amines having molecular weights higher than the crosslinking agent may also be employed. Furthermore, a salt of the above acidic compound containing a quaternary ammonium ion such as a tetraalkylammonium ion, may also be employed. Such foam breaker is used usually in an amount of from 0.01 to 5 parts by weight, preferably from 0.05 to 2 parts by weight, per 100 parts by weight of the above-mentioned high molecular weight polyol (including the polymer-dispersed polyol). However, in the case of a salt, a basic compound having a high molecular weight may be employed, and in such a case, the above amount is calculated excluding the amount of such a base.

As the assisting agents, in addition to the above-mentioned foaming agent, the catalyst, the foam stabilizer and the foam breaker, various other assisting agents may optionally be used. As such other assisting agents, a coloring agent, a flame retardant, an ultraviolet absorber, an antioxidant, a photostabilizer and a filler may, for example, be mentioned.

The molding of the integral foam is preferably conducted by a method of injecting a reactive mixture into a mold by means of a high pressure foaming machine (i.e. by a reactive injection molding method). The high pressure foaming machine is preferably of a usual type wherein two liquids are mixed. One of the liquids is the polyisocyanate and the other liquid is a mixture of all the starting materials except for the polyisocyanate. In some cases, the catalyst or the foam breaker (usually used as dispersed or dissolved in a part of the high molecular weight polyol) may be a separate component, so that a total of three components are injected to form the reactive mixture.

Now, the present invention will be described in further detail with reference to Examples. However, it should be understood that the present invention is by no means restricted by such specific Examples.

EXAMPLES

A mixture comprising a high molecular weight polyol, a crosslinking agent, a foaming agent, etc. as identified in the following Table 1 was charged into a tank at the polyol component side of the high pressure foaming machine, whereas a polyisocyanate was charged to a tank on the isocyanate component side. The reactive injection molding was conducted by adjusting the discharge pressure of the high pressure foaming machine to 180 kg/cm$^2$, the discharge rate to 200 g/sec., and the liquid temperatures of the two components to 23±3° C.

As the shaping mold, a mold having an internal dimension of 800 mm × 400 mm × 10 mm (t) was used, and the mold temperature was adjusted to a level of from 45 to 50° C. Five minutes after injecting the reactive mixture to the mold, the molded product was taken out from the mold. The molded product was left to stand in an atmosphere adjusted to 23° C. overnight, and then the physical properties such as the density, the tensile strength and the elongation, were measured. The results are shown in Tables 1 and 2. The amounts of the materials except for the polyisocyanate were shown by parts by weight.

Rf) being 9 (the average number of RfCH₂CH₂O groups per molecule being 1.7).

TABLE 1

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Starting materials | | | | | | | | | | | |
| Polyol A | 100 | 100 | 100 | 100 | 100 | 100 | 100 | 100 | 100 | 100 | 100 |
| Polyol B | — | — | — | — | — | — | — | — | — | — | — |
| Polyol C | 5 | — | 5 | — | 5 | — | 5 | 5 | — | 5 | — |
| Polyol D | — | 5 | — | 5 | — | 5 | — | — | 5 | — | 5 |
| EG | 8 | 8 | 8 | 8 | 8 | 8 | 8 | 8 | 8 | 8 | 8 |
| Catalyst | 1.4 | 1.4 | 1.4 | 1.4 | 1.4 | 1.4 | 1.4 | 1.4 | 1.4 | 1.4 | 1.4 |
| Foam stabilizer | 1.0 | 1.0 | 1.0 | 1.0 | 1.0 | 1.0 | 1.0 | 1.0 | 1.0 | 1.0 | 1.0 |
| Foaming agent A | — | — | — | — | — | — | — | — | — | — | — |
| Foaming agent B | 18 | 14 | — | — | — | — | — | 7 | 7 | — | 7 |
| Foaming agent C | — | — | 16 | 13 | — | — | — | 7 | 7 | — | — |
| Foaming agent D | — | — | — | — | 13 | 11 | — | — | — | — | — |
| Foaming agent E | — | — | — | — | — | — | 12 | — | — | — | — |
| Foaming agent F | — | — | — | — | — | — | — | — | — | 10 | 5 |
| Polyisocyanate | [105] | [105] | [105] | [105] | [105] | [105] | [105] | [105] | [105] | [105] | [105] |
| Density | 0.5 | 0.6 | 0.5 | 0.6 | 0.5 | 0.6 | 0.5 | 0.6 | 0.6 | 0.6 | 0.5 |
| Tensile strength (kg/cm²) | 17 | 26 | 19 | 30 | 24 | 26 | 22 | 27 | 24 | 22 | 24 |
| Elongation (%) | 212 | 187 | 218 | 192 | 190 | 212 | 217 | 210 | 200 | 190 | 200 |

In a case where the reactive mixture without the foam breaker was used, it was difficult to shorten the molding time (the period from the injection of the reactive mixture to the mold to the withdrawal of the molded product from the mold) shorter than 5 minutes. Then, by using the foam breaker, the molding was conducted in a similar manner, and the minimum molding time to obtain a good molded product was measured. The results are shown in Table 3.

The types of the starting materials used for the Examples and Comparative Examples are as follows.

Polyol (A): A polyoxypropyleneoxyethylene triol having 8% by weight of oxyethylene groups only at the molecular terminals and having a hydroxyl value of 26 with the number of hydroxyl groups being 3.

Polyol (B): A polyoxypropyleneoxyethylene triol having 20% by weight of oxyethylene groups only at the molecular terminals and having a hydroxyl value of 28 with the number of hydroxyl groups being 3.

Polyol (C): A diol obtained by adding 4 mols of propyleneoxide to 1 mol of bisphenol A.

Polyol (D): A diol obtained by adding 4 mols of propyleneoxide to 1 mol of aniline.

EG: Ethylene glycol

Catalyst: Triethylenediamine-EG solution ("Dabco-EG" tradename)

Foaming agent: Silicone foaming agent ("SF-2962" tradename, manufactured by Toray Silicone K.K.)

Polyisocyanate: Modified diphenylmethane diisocyanate ("C-1050" tradename, manufactured by Nippon Polyurethane K.K.), isocyanate content: 23% by weight. The amount of the polyisocyanate was shown by an index (100 times of the equivalent of the polyisocyanate relative to one equivalent of the total materials reactive with the isocyanate groups).

Foaming agent A: R-11

Foaming agent B: R-123

Foaming agent C: R-141b

Foaming agent D: Methylene chloride

Foaming agent E: A mixture containing methylene chloride and R-11 in equal amounts by weight.

Foaming agent F: R-22. Foam breaker: A salt of diethanolamine and a mixture of phosphoric acid monoester and diester of Rf—CH₂CH₂—OH with the carbon number of the perfluoroalkyl group (represented by

TABLE 2

| | Comparative Examples | | | | | |
|---|---|---|---|---|---|---|
| | 1 | 2 | 3 | 4 | 5 | 6 |
| Starting materials | | | | | | |
| Polyol A | — | — | — | — | — | — |
| Polyol B | 100 | 100 | 100 | 100 | 100 | 100 |
| Polyol C | — | — | — | — | — | — |
| Polyol D | — | — | — | — | — | — |
| EG | 10 | 10 | 10 | 10 | 10 | 10 |
| Catalyst | 1.4 | 1.4 | 1.4 | 1.4 | 1.4 | 1.4 |
| Foam stabilizer | 1.0 | 1.0 | 1.0 | 1.0 | 1.0 | 1.0 |
| Foaming agent A | 12 | — | — | — | — | — |
| Foaming agent B | — | 18 | — | — | — | — |
| Foaming agent C | — | — | 16 | — | — | — |
| Foaming agent D | — | — | — | 12 | — | — |
| Foaming agent E | — | — | — | — | 13 | — |
| Foaming agent F | — | — | — | — | — | 11 |
| Polyisocyanate | [105] | [105] | [105] | [105] | [105] | [105] |
| Density | 0.5 | — (note) | — (note) | — (note) | — (note) | — (note) |
| Tensile strength (kg/cm²) | 24 | — | — | — | — | — |
| Elongation (%) | 150 | — | — | — | — | — |

Note: In Comparative Examples 2 to 5, no satisfactory integral skin was formed, and no integral-skin foam was obtained.

TABLE 3

| | Examples | | | |
|---|---|---|---|---|
| | 12 | 13 | 14 | 15 |
| Starting materials | | | | |
| Polyol A | 100 | 100 | 100 | 100 |
| Polyol C | 5 | 5 | — | — |
| Polyol D | — | — | 5 | 5 |
| EG | 8 | 8 | 8 | 8 |
| Catalyst | 1.4 | 1.4 | 1.4 | 1.4 |
| Foam stabilizer | 1.0 | 1.0 | 1.0 | 1.0 |
| Foaming agent B | 18 | — | 7 | 7 |
| Foaming agent C | — | — | 7 | — |
| Foaming agent F | — | 10 | — | 5 |
| Foaming breaker A | 0.5 | 0.5 | 0.3 | 0.3 |

TABLE 3-continued

| | Examples | | | |
|---|---|---|---|---|
| | 12 | 13 | 14 | 15 |
| Polyisocyanate | [105] | [105] | [105] | [105] |
| Molding time | 2 min | 2 min | 3 min | 3 min |
| Density | 0.5 | 0.5 | 0.6 | 0.6 |
| Tensile strength (kg/cm$^2$) | 18 | 17 | 22 | 22 |
| Elongation (%) | 215 | 200 | 196 | 186 |

What is claimed is:

1. A method for producing a molded product of integral-skin polyurethane foam, which comprises reacting and curing a composition consisting essentially of (1) a high molecular weight polyol comprising, as the main component, a polyoxyalkylene polyol having, as the main constituent, oxyalkylene groups of at least 3 carbon atoms and oxyethylene groups at its molecular terminals and an overall oxyethylene group content of 5% to 15% by weight and having a hydroxyl value of not higher than 80, (2) a crosslinking agent containing a compound having an aromatic nucleus and at least two active hydrogen-containing groups selected from the group consisting of hydroxyl groups, primary amino groups and secondary amino groups, and (3) a polyisocyanate, in a mold in the presence of a catalyst and a hydrogen atom-containing halogenated hydrocarbon foaming agent.

2. The method according to claim 1, wherein the polyoxyalkylene polyol is a polyoxyalkylene polyol having at least 5% by weight of oxyethylene groups at its molecular terminals with the overall oxygen group content being not higher than 12% by weight and having a hydroxyl value of not higher than 80.

3. The method according to claim 2, wherein the polyoxyalkylene polyol is a polyoxypropylene oxyethylene polyol having oxyethylene groups substantially only at its molecular terminals and having a hydroxyl value of not higher than 45.

4. The method according to claim 1, wherein the polyoxyalkylene polyol is a polymer-dispersed polyoxyalkylene polyol containing fine polymer particles.

5. The method according to claim 1, wherein the crosslinking agent is a combination of a compound having a molecular weight of less than 150 per active hydrogen-containing group and a compound having a molecular weight of not higher than 600 per active hydrogen-containing group and having an aromatic nucleus.

6. The method according to claim 5, wherein the compound having a molecular weight of less than 150 per active hydrogen-containing group is a compound having two active hydrogen-containing groups and a molecular weight of less than 200 and having no aromatic nucleus.

7. The method according to claim 6, wherein the compound having two active hydrogen-containing groups and a molecular weight of less than 200 and having no aromatic nucleus, is a diol.

8. The method according to claim 5, wherein the compound having a molecular weight of not higher than 600 per active hydrogen-containing group and having an aromatic nucleus, is a polyol having a molecular weight of at least 100 per hydroxyl group and having an aromatic nucleus.

9. The method according to claim 8., wherein the polyol having a molecular weight of at least 100 per hydroxyl group and having an aromatic nucleus, is a polyol obtained by adding an alkylene oxide to a polyfunctional phenol or to an aromatic nucleus-containing amine having at least two amine-type hydrogen atoms.

10. The method according to claim 1, wherein the crosslinking agent is used in an amount of from 6 to 25 parts by weight per 100 parts by weight of the polyoxyalkylene polyol, wherein at least 3 parts by weight is a crosslinking agent having an aromatic nucleus.

11. The method according to claim 1, wherein the crosslinking agent is used in an amount of from 6 to 25 parts by weight per 100 parts by weight of the polyoxyalkylene polyol, wherein at least 3 parts by weight is a crosslinking agent having no aromatic nucleus and at least 3 parts by weight is a crosslinking agent having an aromatic nucleus.

12. The method according to claim 1, wherein the hydrogen atom-containing halogenated hydrocarbon foaming agent is a hydrogen atom-containing halogenated hydrocarbon group having a boiling point of from 15 to 50° C.

13. The method according to claim 12, wherein the hydrogen atom-containing halogenated hydrocarbon foaming agent is at least one halogenated hydrocarbon selected from the group consisting of 1,1-dichloro-1-fluoroethane, 1,1-dichloro-2,2,2-trifluoroethane and methylene chloride.

14. The method according to claim 1, wherein the polyisocyanate is diphenylmethane diisocyanate or its derivative.

15. The method according to claim 1, wherein a foam breaker is used together with the catalyst and the hydrogen atom-containing halogenated hydrocarbon foaming agent.

16. The method according to claim 15, wherein the foam breaker is an acidic compound having a fluoroalkyl group or its salt.

17. The method according to claim 16, wherein the fluoroalkyl group is an alkyl group containing a highly fluorinated polyfluoroalkyl group having from 3 to 17 carbon atoms.

18. The method according to claim 16, wherein the acidic compound is a phosphoric acid monoester of an alcohol having a fluoroalkyl group, a phosphoric acid diester of an alcohol containing a fluoroalkyl group, or a mixture thereof.

19. The method according to claim. 16, wherein the salt is an amine salt.

20. The molded product of integral-skin polyurethane foam prepared by the method of claim 1.

* * * * *